United States Patent
Wedel, Jr.

(10) Patent No.: US 6,677,882 B1
(45) Date of Patent: Jan. 13, 2004

(54) MULTI-OCTAVE HIGH-RESOLUTION RECEIVER FOR INSTANTANEOUS FREQUENCY MEASUREMENTS

(75) Inventor: John O. Wedel, Jr., Ellicott City, MD (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 1,826 days.

(21) Appl. No.: 05/771,060

(22) Filed: Feb. 24, 1977

(51) Int. Cl.[7] .............................. G01S 7/40; G01S 7/285
(52) U.S. Cl. ..................... 342/13; 342/192; 342/193; 324/76.23; 324/76.43; 327/41
(58) Field of Search ................................. 325/332, 333, 325/334, 432, 435, 316; 342/13, 89, 98, 175, 192–196; 324/76.23, 76.26, 76.27, 76.41, 76.43; 327/39–41, 44, 47, 98, 113, 114; 455/132, 334, 337

(56) References Cited

U.S. PATENT DOCUMENTS

| | | | |
|---|---|---|---|
| 2,586,894 A | * | 2/1952 | Williams et al. ............ 325/332 |
| 2,954,465 A | * | 9/1960 | White ........................ 325/332 |
| 2,967,998 A | * | 1/1961 | Hurvitz ...................... 325/332 |
| 2,971,155 A | * | 2/1961 | Hurvitz ...................... 325/333 |
| 3,019,975 A | * | 2/1962 | Williams ............... 235/92 EV |
| 3,488,594 A | * | 1/1970 | Caballero, Jr. .............. 325/332 |
| 3,641,438 A | * | 2/1972 | Canty ........................ 325/332 |
| 4,083,004 A | * | 4/1978 | Cohn ........................ 455/18 |
| 4,100,378 A | * | 7/1978 | Claasen et al. .............. 702/74 |
| 4,101,890 A | * | 7/1978 | Goyard ...................... 342/193 |
| 4,122,394 A | * | 10/1978 | Fukushima et al. ...... 455/155.1 |
| 4,188,629 A | * | 2/1980 | Johnson ..................... 342/46 |
| 4,264,909 A | * | 4/1981 | Hamilton et al. ............. 342/13 |
| 5,291,199 A | * | 3/1994 | Overman et al. ............. 342/13 |
| 6,531,979 B1 | * | 3/2003 | Hynes ........................ 342/90 |

OTHER PUBLICATIONS

"A Submillimeter Measurement System Using a Harmonic Mixing Superheterodyne Receiver", Cotton, J.M.; Microwave Theory and Techniques, IEEE Transactions on, vol.: 11 Issue: 5, Sep. 1963 Page(s): 385–389.*
"Whistle Generation in Superheterodyne Receivers", Huenemann, R.; Communications, IEEE Transactions on [legacy, pre–1988], vol.: 18 Issue: 2, Apr. 1970 Page(s): 158–159.*
"Modular Arithmetic . . . An Ancient Science for a new Computer", *Westinghouse Engineer*, Vol 23, No. 4, Jul. 1963, p 112–114, copy in 178/22.*

* cited by examiner

*Primary Examiner*—John B. Sotomayor
(74) *Attorney, Agent, or Firm*—John J. Karasek; John Gladstone Mills

(57) ABSTRACT

An RF band receiver for concurrently monitoring a plurality of contiguous channels within the RF spectrum to unambiguously detect time-coincident signals. The receiver includes a plurality of transmission paths feeding a like number of digital, mixed-base code channels. Each mixed-base code channel includes a harmonic mixer, an IF amp, a plurality of bandpass-filters and a like plurality of detectors. The outputs of the detectors for each mixed-base code channel are fed to a frequency sorter whose output is a digital frequency word which indicates the frequency(s) of the received signal(s).

2 Claims, 3 Drawing Sheets

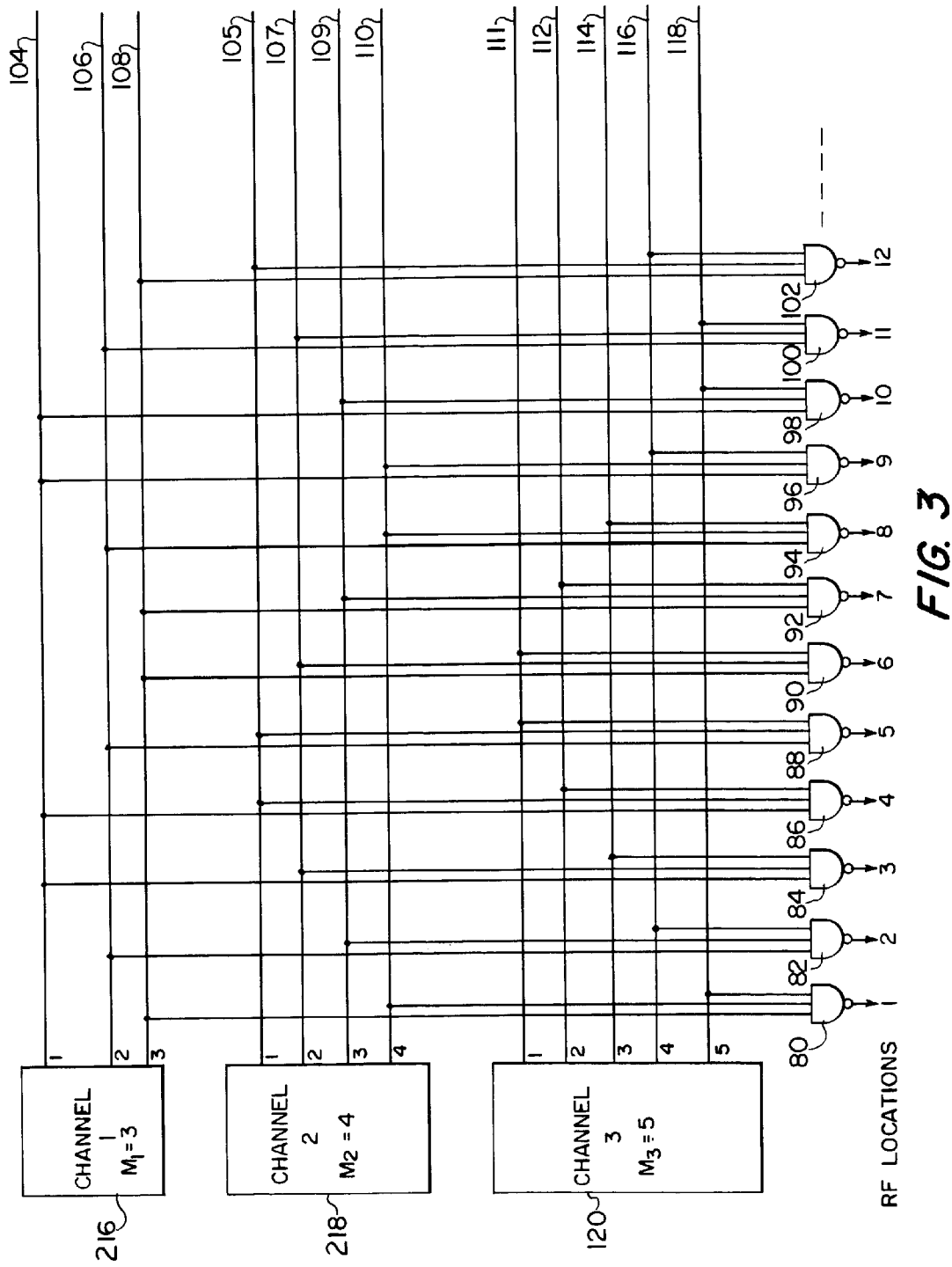

MULTI-OCTAVE HIGH-RESOLUTION RECEIVER FOR INSTANTANEOUS FREQUENCY MEASUREMENTS

BACKGROUND OF THE INVENTION

This invention relates generally to R-F receivers and more particularly to multioctave, high-resolution, super-heterodyne receivers utilizing harmonic mixing and mixed-base coding techniques to resolve ambiguities caused by time-coincident signals.

It is often necessary, in the pursuit of electronic intelligence and electronic countermeasure activities, to detect signals which may occur anywhere within a wide range of the R-F spectrum. In the past, a wide variety of approaches has been taken to resolve this problem, the four most common approaches being:

(1) The channelized receiver;
(2) The double-conversion, channelized, supper-heterodyne receiver;
(3) The instantaneous frequency measurement (IFM) receiver; and
(4) The microscan receiver. Each will now be described.

The channelized receiver represents the ideal receiver if performance is the only consideration; however; to cover the radar frequency range of 0.5 to 20 GHz and provide ±5 MHz resolution would require 1,950 filters plus amplifiers, an inordinately large, costly unit.

The second approach, the double-conversion, channelized, super-heterodyne receiver, prefilters the RF band into convenient sub-bands, each of which is then heterodyned into a common first IF amplifier. The IF output is further channelized by a second set of band filters following the first IF. These filtered outputs are again heterodyned into a second IF amplifier and finally channelized by a set of contiguous bandpass filters. The received signal frequency is determined by decoding the video detector outputs of each channel. Several design problems are inherent in this approach, among which are: a) measuring the frequencies of time-coincident signals, b) resolving the ambiguity caused by a signal entering the receiver at the many subband filter crosscovers, and c) the complexity, large size and expense of the equipment.

The third approach is the instantaneous frequency measurement receiver. Normally, to cover the RF bandwidth, a channelized super-heterodyne is used to reduce the bandwidth to an octave or less. This octave bandwidth is then processed by one or more frequency discriminators that cover the band. Each discriminator consists of two delay lines and a phase detector, the output of the phase detector and subband channel detector then being processed to provide the digitally encoded frequency word. In addition to its size, cost, and complexity, the IFM receiver has the same problems as the double-conversion channelized super-heterodyne receiver, as described above.

A fourth approach is the microscan receiver, the heart of which consists of a dispersive delay line that is in the signal path. These lines result in a relatively narrow bandwidth and high insertion loss; therefore, a channelized super-heterodyne receiver, with all its drawbacks, is required prior to the microscan processing. In operation, the signal whose frequency is to be determined is mixed with a VCO that is rapidly tuned over the band of interest in a time less than the minimum radar pulse width whose frequency is to be measured. The heterodyned IF signal is a chirp (linear FM) signal. After amplification, the signal is recompressed by a dispersive delay line. The time spent in the delay line will be a function of the frequency of the signal. By measuring this time, and knowing in what subband the signal was received, the signal frequency can be determined.

Many problems have been found in implementing this type of receiver. Most of them occur in the delay line and include: a) triple travel; b) insertion loss; c) narrow band width; d) temperature sensitivity; e) slow data rate; and f) all of the problems encountered with a channelized super-heterodyne receiver, as detailed above.

In order to provide the basis for a clear understanding of the present invention, it is helpful at this point to briefly discuss the mixed-base code notation and its relationship to more conventional number systems. The discussion will include basic principles of a simple mixed-base code and of a staggered mixed-base code suitable for use in the apparatus according to the invention.

A variety of different number systems have been employed for coding purposes, the most common being those number systems utilizing a common base. Each digital word is written or coded in shorthand notation as a series of digits $a_n, a_{n-1}, a_{n-2}, \ldots a_0$ where the a's are coefficients of successive powers (from right to left) of an integer termed the base or radix—thus the positional notation of common-base number systems is merely an arrangement wherein each position or column is weighted according to successive powers of the base, and therefore constitutes an abbreviated version of the more complex expression $\Sigma K^{-a} k^{-ra}$ where r is the base (radix) and $0 \leq a_k \leq r-1$. In the decimal system for example, r=10 so that the coefficients $a_k$ (digits forming a word in the positional notation) extend from 0 through 9. Similarly, binary numbers (words) are based on r=z, with $a_k$ taking on the values 0 and 1; octal words on r=8, $0 \leq a_k \leq 7$; and so forth.

The mixed-base notation, employed in the present invention, on the other hand, refers to a coding scheme or digital format wherein the digits in each column or position are referenced to a different base, with no positional weighting. The scheme is, in fact, based on the use of different moduli m for each position so that the digit in each column is actually the remainder deriving from the division of a real integer by an integral multiple of the modulo $m_k$ for that column or position. In a 3-4-5 mixed-base code, for example, the positional notation is based on modulo 3, modulo 4, and modulo 5, so that the word "15" in decimal notation is designated "030" in 3-4-5 mixed-base notation. It will readily be observed that this result is a consequence of the fact that 15 is an integral multiple of 3, viz 15/3=5 remainder 0, 15/4=3 remainder 3, and similarly, 15/5= remainder 0. It will also be apparent that digits in each column or position can take on only the values $0 \leq b_k \leq m_k - 1$ where $b_k$ is the digit in the position k based on modulo $m_k$.

It will be apparent, therefore, that a simple mixed-base code is limited to a series of nonredundant digital words over a range of values equal to the lowest common denominator of the moduli. In the case of the 3-4-5 mixed-base notation, 3×4×5=60 (the lowest common denominator of 3, 4, and 5) so that decimal numbers 0 through 59 inclusive, for example, may be expressed without ambiguity. Of course, the non-redundant word capacity of a mixed-base code increases as the number of moduli increases or as the value of the integer representing each modulo increases.

Detailed discussion of the mixed-base notation is available in the prior art (see, e.g., U.S. Pat. No. 3,488,594 to J. Caballero, Jr., and U.S. Pat. No. 3,019,975 to R. E. Williams), so that the presentation here has been relatively brief, confined to very basic principles of the code. It is convenient for purposes of the present invention, to depart slightly from the usual mixed-base notation by allowing the digits $b_k$ in each position K to take on the values $1 \leq b_k \leq m_k$. In other words, a digit in the position based on modulo 3 may have a value of either 1, 2, or 3, corresponding to the normal values 0, 1, or 2, respectively, with similar considerations applying to digits in positions based on the remaining moduli of the code. Here again, this is purely a matter of convenience, rather than a limitation of the inventive principles.

The development of wideband microwave receivers may be accomplished in a manner representing a practical application of the mixed-base coding concept. For example, a receiver may be designed with one channel for each column (position) in the mixed-base code, the number of parallel outputs from each channel corresponding to the numerical value of the base (modulo integer) of each column. The receiver may be designed in such a manner that, as the frequency of the receiver signal varies from one end of the band to the other, the output of each channel cycles in accordance with the mixed-base code. For a 3-4-5 mixed base code, the receiver would consist of three channels having a total of twelve output leads (i.e., 3+4+5=12). The outputs for each channel could be derived from the respective outputs of narrowband I-F filters, each channel thereby requiring a number of filters equal to the numerical value of the base of the mixed-code column to which that channel corresponds. Thus, for the 3-4-5 code, the first channel would require three filters, the second channel four filters, and the third channel five filters. By using a comb of harmonically related signals as the local oscillators for each channel, the outputs of the filters will cycle in the required manner. In this fashion, receiver resolution equivalent to 60 narrowband channels, or frequency cells, can be obtained by use of only 12 filters and 3 harmonic generators. The AN/SLQ-7 and AN/ULR-12 EMC receivers are typical of equipment using technique.

Caballero, Jr., U.S. Pat. No. 3,488,594 discloses an RF receiver that appears to operate in the same general manner as the receiver disclosed herein, but with several important drawbacks. The primary drawback of the invention of Caballero, Jr., is that it does not disclose and, in fact, teaches away from resolving an ambiguity which arises when two signals are received at the same time. Where it is necessary to determine the individual frequencies detected, as is sometimes required by advanced radar warning systems or ELINT applications to which the present invention is directed, it is absolutely necessary to provide unambiguous, time-coincident, frequency detection.

Another drawback of the Caballero, Jr., invention is that it provides for only 10 MHz resolution. Often-times it is desirable, especially in military applications and where wide portions of the RF spectrum, such as 0.5 to 20 GHz, are to be covered by the receiver, to obtain better resolution. Applicant's invention overcomes this problem also.

Additionally, the Caballero, Jr., receiver cannot cover more than a single octave of the RF spectrum. This requires many different receivers, each covering a single octave, to provide detection capability throughout the many-octave RF spectrum, particularly 1.0 to 18.16 GHz. Applicant's invention overcomes this problem through the use of harmonic mixing.

Finally, Caballero, Jr., discloses a receiver which is costly to build. Each channel requires bandpass filters (frequency cells) of different bandwidths to monitor the incoming IF signal from the mixer. These filters are costly and requiring these different filters with different bandwidths adds additional sums to the total expenditure necessary to produce such a receiver. The disclosed invention requires only that the number of filters within each channel be increased. The bandwidth of each filter is always the same and depends upon the desired resolution of the receiver.

Although Caballero, Jr., was an improvement over the prior art, that invention, like all of the previously described receivers, has shortcomings and disadvantages vis-a-vis providing instantaneous unambiguous frequency measurements over the multioctave RF bandwidth, particularly where high-resolution measurements of time-coincident signals are required.

SUMMARY OF THE INVENTION

The present invention is a wide-band, high-resolution receiver for concurrently monitoring a plurality of contiguous frequency channels in a preselected band of the RF spectrum and for detecting and indicating the presence of a single signal, or time-coincident signals, within any of said channels by conversion of the signals(s) to a digital mixed-base code notation representative of the RF channel(s) carrying said signal(s). Said receiver is comprised of two or more channels, each of identical elements, though of different values. Each channel includes harmonic mixer means, an IF amplifier, a plurality of filter means and a plurality of detector means, each unique to a filter means. The output of all detector means is fed to a frequency sorter means which provides an output corresponding to the RF channel in which the received signal was transmitted. The use of two channels of the above-described receiver will unambiguously indicate the frequency of one RF signal. The use of three or more channels, as needed, will unambiguously detect and determine the RF frequency of time-coincident signals.

OBJECTS OF THE INVENTION

It is therefore an object of the present invention to resolve ambiguities in super-heterodyne receivers caused by time-coincident signals.

A further object of the present invention is to utilize harmonic mixing as a technique for resolving ambiguities in a super-heterodyne receiver.

Another object of the present invention is to provide multioctave bandwidth capability in a super-heterodyne receiver utilized for instantaneous frequency measurements.

A still further object is to provide unambiguous signal detection in a more efficient manner at lower cost and in a smaller size package than existing receivers.

BRIEF DESCRIPTION OF THE DRAWINGS

Other objects and many of the attendant advantages of the present invention will be readily apparent from the following detailed description and appended claims, considered in conjunction with the accompanying drawings, wherein:

FIG. 3 is a schematic diagram of the frequency sorter.

DESCRIPTION OF THE PREFERRED EMBODIMENT

Figure 1:
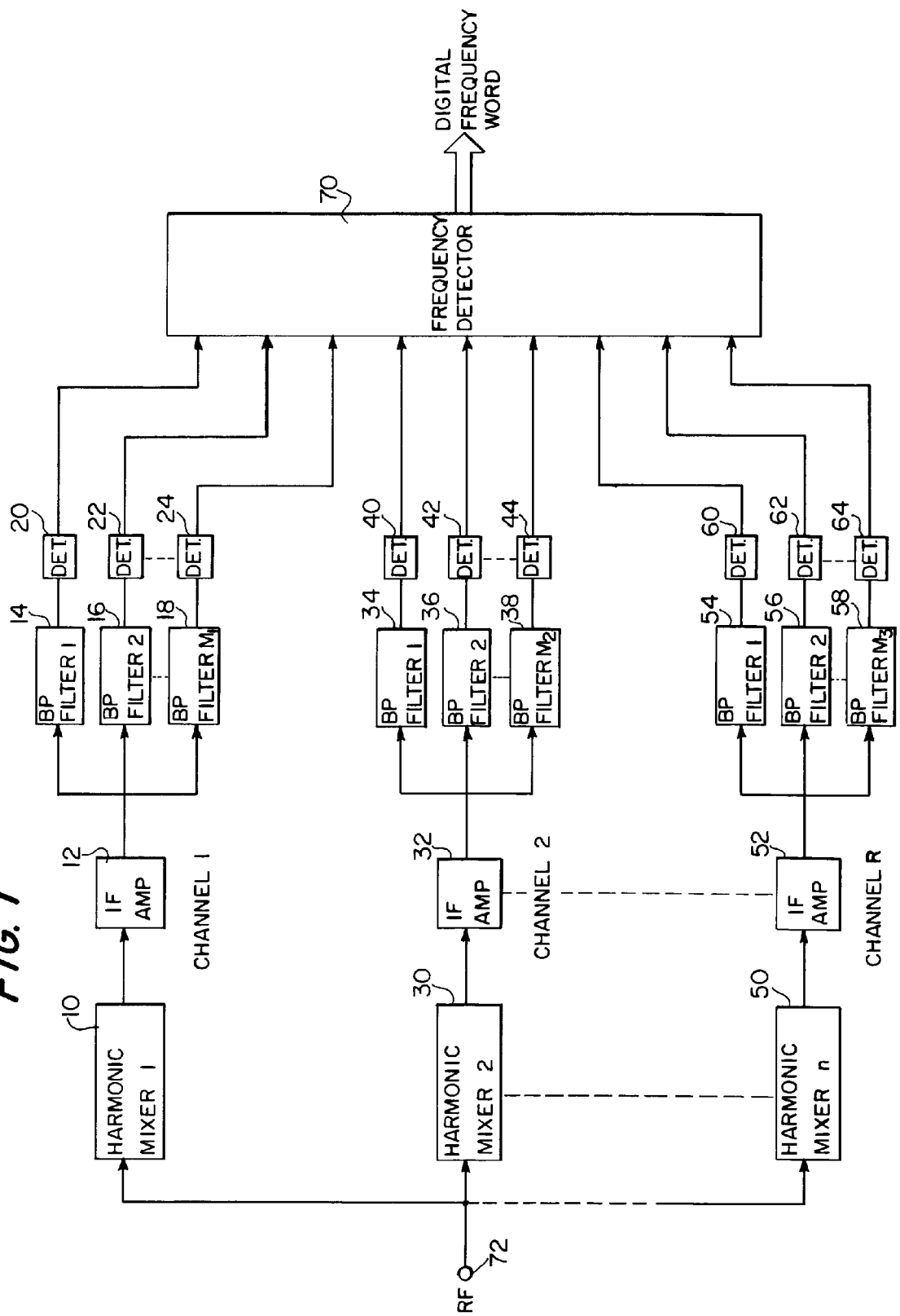
FIG. 1 is a block diagram of an embodiment of the present invention.

Referring now to the drawings, FIG. 1 shows an RF input point 72 to which an RF signal is applied. RF input point 72 is connected to a first harmonic mixer 10, which in turn is connected to a first IF amp 12. IF amp 12 is connected to a plurality of bandpass filters 14, 16, 18 simultaneously, each of which is connected to its own detector 20, 22, and 24, respectively. Each detector 20, 22 and 24 is connected individually to frequency sorter 70.

At least two channels of like construction comprise the invention, n channels being shown. At least two bandpass filters may be used in each channel, the three shown being for illustrative purposes only. Further, the number of bandpass filters so associated with each channel must be different to provide proper operation. Discussion of the determination of the number of bandpass filters necessary is contained later in the specifications.

Figure 2:
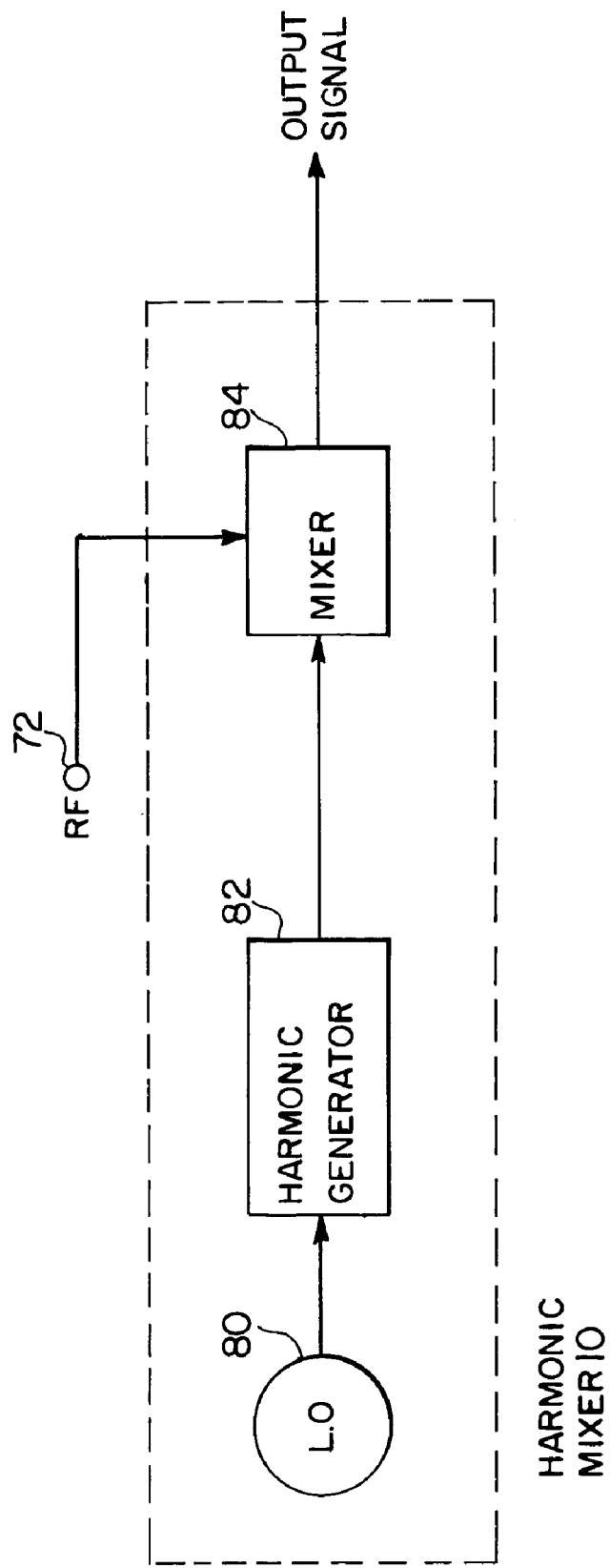
FIG. 2 is a block diagram of the elements which comprise the harmonic mixer.

FIG. 2 shows the construction of harmonic mixer 10. A local oscillator 80 is connected to harmonic generator 82 which is in turn connected to mixer 84. The RF signal from input point 72 is fed to the mixer 84.

FIG. 3 shows one embodiment of a frequency sorter. The circuitry of receiver channel 1 (216) is connected to detector output lines 104, 106, and 108. Each AND circuit 80, 82, 84, 86, 88, 90, 92, 94, 96, 98, 100 and 102 has one input connected to one of the detector output lines, as follows:

AND circuit 80 is connected to detection output line 108;

AND circuit 82 is connected to detection output line 106;

AND circuit 84 is connected to detection output line 104;

AND circuit 86 is connected to detection output line 104;

AND circuit 88 is connected to detection output line 106;

AND circuit 90 is connected to detection output line 108;

AND circuit 92 is connected to detection output line 108;

AND circuit 94 is connected to detection output line 106;

AND circuit 96 is connected to detection output line 104;

AND circuit 98 is connected to detection output line 104;

AND circuit 100 is connected to detection output line 106; and

AND circuit 102 is connected to detection output line 108

In a similar manner, the second inputs of the aforementioned AND circuits are each connected in turn to detector output lines 110, 109, 107, 105, 105, 107, 109, 110, 110, 109, 107 and 105. The third inputs of said AND circuits are connected similarly. Thus, the first inputs in each of said AND circuits are connected only to a detector output line corresponding to receiver channel 1 (216), while the second inputs of said AND circuits are connected only to a detector output line corresponding to receiver channel 2 (218) and the third inputs of said AND circuits are connected only to a detector output line corresponding to receiver channel 3 (120). Note that the combination of three detector-circuit inputs for each AND circuit is different from the combination for any other AND circuit. Only when a signal is present at all inputs of the AND circuit will an individual AND circuit transmit an output signal corresponding to the IF location where the RF input signal was received.

In operation, each channel of the invention works as follows: An RF signal within the RF bandwidth the receiver is designed to detect is fed to harmonic mixer 10. Local oscillator 80 transmits a signal to harmonic generator 82 which in turn transmits harmonics of that frequency to mixer 84. The spacing of these harmonics is chosen to be twice the IF bandwidth of IF amp 12, while at the same time the harmonics span the RF band of interest (a zero IF is assumed for ease of explanation but is not required). This allows the entire RF band to be folded into IF amplifier 12. The output of harmonic mixer 10 is comprised of a plurality of signals: the additions of the RF signal from RF input point 72 and the local oscillator frequency plus its generated harmonics; and the differences of the same signals. The difference-frequency signals are fed to IF amp 12, forming subbands. Since the signal RF is known to within a bandwidth equal to the IF bandwidth, bandpass filters 14, 16 and 18 are simultaneously fed the folded-down signal from IF amp 12. These filters have the same bandwidth, are contiguous, and provide additional resolution over that obtained solely by use of IF amp 12. If still further resolution is required, frequency discriminators may be connected at the outputs of bandpass filters 14, 16 and 18 ahead of detectors 20, 22 and 24 respectively.

In its'simplest embodiment, the minimum number of bandpass filters per channel necessary for the invention to operate properly is 2. This result is dictated by the use of a mixed-base coding system to identify the receipt of a signal within a particular subband. Each bandpass filter and its accompanying detector are designed to indicate the presence of a signal within its specific subband. A much more detailed explanation of these mixed-base code principles is contained in Caballero, Jr. Contrary to the teachings of Caballero, Jr., the present invention comprises bandpass filters whose bandwidths are the same, without regard to which channel they occupy. The only difference between channels as far as the bandpass filters are concerned is the number required to resolve the IF signal received from IF amp 12. Thus the bandwidth and number of filters necessary is dependent upon the desired resolution of the receiver. Each bandpass filter is designed with a bandwidth equal to twice the desired resolution and manufactured so as to pass a signal above or below the center point of that bandwidth. Thus, for example, when the desired frequency resolution is ±5 MHz, the bandwidth would be 10 MHz and the center frequency of the first filter would be 5 MHz from the initial IF amplifier bandwidth. (In this example, the center frequency of the filter will be considered to be above that of the IF amplifier.) If the initial IF amplifier is 0 MHz, the first filter of each channel would be at +5 MHz and pass all signals it receives between 0 and 10 MHz. The center frequency of the second filter would be located at 15 MHz, and the filter would transmit all signals it receives between 10 and 20 MHz. Since a signal that fell at 10 MHz would be passed by both filters and trigger two detectors, the disclosed receiver requires a minimum of two channels to unambiguously determine the frequency of the RF signal applied at signal input point 72.

The circuitry of the required second channel would be generally the same as the circuitry of the first channel commencing with harmonic mixer 10 as illustrated in FIG. 1, except for several important differences. While the RF signal transmitted from signal input point 72 is applied to harmonic mixer 30 at the same time as its application to harmonic mixer 10 and any other harmonic mixers as represented by $n^{th}$ harmonic mixer 50 corresponding to an $n^{th}$ channel of the disclosed receiver, the local oscillators, each of which comprises an element of the harmonic mixers, are chosen to be at related, but different, frequencies. Likewise, since each local oscillator frequency is different, the IF amplifier bandwidths will also be different. A third important difference is that the number of bandpass filters which receive the IF amplifier signal simultaneously must be greater in each successive channel (as directed by the Chinese Remainder Theorem and mixed-base code techniques), although the bandwidth of each filter remains exactly the same. Thus, once the total number of filters required by the channel requiring the maximum number of such filters is determined, the filters can be manufactured on chips which contain that maximum number of filters. A single chip can be used for each channel, with the surplus number of filters in each channel (except the channel requiring the maximum number, of course), not connected to the other circuitry.

Referring again to FIG. 1, although only 3 filters are shown for each channel for simplicity, it can be easily seen that by using 12 (3, 4 and 5 filters in each channel, respectively) contiguous RF filter locations, (i.e., bandwidths) the RF frequency can be determined without any ambiguity. The number of RF locations that can be resolved without ambiguities can be further increased by increasing the number of bandpass filters (when concerned with frequencies in the GHz range, video filters may be used) or the number of parallel channels. The disclosed invention used the latter method to provide instantaneous frequency measurements. Frequency sorter 70 shown in FIG. 1 may be extremely simple and is well-known in the art.

To provide a precise method to predict the harmonic spacing, relationship between harmonics, number of filters, and the number of channels to cover a given RF band with a given resolution, the Chinese Remainder Theorem can be used. This theorum is described in detail in Casallero, Jr., and R. E. Williams, which are incorporated by reference herein. Therefore, no explanation need be given here.

To illustrate the frequency-resolving capabilities of the disclosed invention, the following example is given with the understanding that it is only that—an illustration of one of many embodiments of applicant's invention.

Assume the RF bandwidth to be covered by the receiver is 1.0 to 18.16 GMz. Also assume the RF band is to be resolved into ±5 MHz increments or 1716 parts. Assuming the use of a three-channel receiver, $M_1 M_2 M_3 = 1716$. A combination that could be used to satisfy that equation and also the Chinese Remainder Theorem is:

$M_1 = 11$ $M_2 = 12$ $M_3 = 13$

Thus the first channel would contain 11 video filters dividing the RF subband into 11 RF locations. The second channel would contain 11 video filters with the same center frequencies and bandwidth as those in the first channel. In addition, it would contain a twelfth filter location with a center bandwidth 10 MHz greater than that of the 11th filter location. The same principles would apply to the third channel. This it can be seen that the number of filters per channel is related by prime numbers, a relation which must always remain true when determining the proper number of filters for any given situation. This result is the essence of the Chinese Remainder Theorem.

Since the first channel must thus contain 11 filters, each with a bandwidth of ±5 MHz, to cover the entire bandwidth of the associated IF amplifier, it can be readily seen that the bandwidth of that IF amplifier would be 11×10 MHz or 110 MHz. Since the second channel requires 12 filters to cover its IF amplifier, the bandwidth of the second channel IF amp would be 120 MHz. In a likewise manner, the bandwidth of the third channel IF amplifier would be 130 MHz. In this example, the harmonic spacing has been chosen to be twice the bandwidth of the IF amplifier, although any spacing, twice or greater than that of the IF amplifier may be used. Thus, the local oscillator frequencies of the respective channels would be 220 MHz, 240 MHz and 260 MHz.

While the above-described embodiment illustrates a wide band, multioctave, high-resolution receiver which provides instantaneous frequency measurements, an additional channel must be added to resolve time-coincident signal frequencies. Since this is a quite complex matter where 1716 RF locations are concerned, this feature of the invention will be described using only 12 RF locations although it is to be understood that such an embodiment is for illustrative purposes only and the same methods and principles may be applied to any receiver utilizing the concept of applicant's invention, and more RF locations than that described in the following example.

Again, consider the 12 RF location receiver wherein the first channel contains 3 video filters to divide the RF subband and the second channel contains 4 video filters of same bandwidth as those of channel 1. Thus 12 RF locations (3×4) are provided. To resolve time-coincident signal ambiguities, a third channel, containing 5 video filters with the same IF bandwidth and appropriate harmonic spacing, is added. A representation is shown in Table A.

TABLE A

| 1st channel | ③ | ② | 1 | 1 | ② | ③ | ③ | ② | 1 | 1 | ② | ③ | 3 | 2 | 1 | 1 | 2 | 3 | 3 | 2 |
|---|---|---|---|---|---|---|---|---|---|---|---|---|---|---|---|---|---|---|---|---|
| 2nd channel | 4 | ③ | 2 | ① | ① | 2 | ③ | 4 | 4 | ③ | 2 | ① | 1 | 2 | 3 | 4 | 4 | 3 | 2 | 1 |
| 3rd channel | 5 | 4 | 3 | ② | ① | ① | ② | 3 | 4 | 5 | 5 | 4 | 3 | 2 | 1 | 1 | 2 | 3 | 4 | 5 |
| RF location | 1 | 2 | 3 | 4 | 5 | 6 | 7 | 8 | 9 | 10 | 11 | 12 | 13 | 14 | 15 | 16 | 17 | 18 | 19 | 20 |

← RF Band of Interest →

Video Filter Outputs as a Function of RF Location Using a Third Channel to Resolve Time-Coincident Signals.

Now, assume that two RF signals are time-coincident in RF locations 5 and 7. Thus outputs will be seen in filters 1 and 2 of channel B. The RF output signals from video filters 1 and 2 are shown by circles in Table A. Similarly, video outputs are observed on filters 1 and 3 of channel 2 and video filters 2 and 3 of channel 1, resulting in frequency ambiguities per channel shown by all the circles in Table A. Using only a two-channel receiver, (e.g., channels 1 and 2) signals would appear to have been received in RF locations 2, 5, 7 and 12. However, the only frequency locations circled in all three channels are 5 and 7.

Thus, a three-channel receiver is required to resolve time-coincident ambiguities. A system that can be used to provide channel detection such as illustrated above and also an output signal corresponding to the channel frequency range in which the signal was detected uses a frequency sorter 70.

One such type of frequency sorter may be implemented for a 12 RF location receiver by utilizing 12 AND circuits connected in such a manner that the presence of a signal from all of the detectors to which that particular AND circuit is connected will cause the AND circuit to transmit a signal. This signal is used to indicate the presence of a received signal within the bandwidth to which that AND circuit pertains. One such sorter is illustrated in FIG. 3 and its operation will be described by use of the previous example where two RF time-coincident signals are received in RF locations 5 and 7.

Detector output lines 106 and 108 would thus contain a signal. Likewise, the receipt of the RF signal by the three-channel receiver would give rise to a signal on detector output lines 105 and 109. Similarly, a signal would be present in detector output lines 111 and 112. This would cause one signal to be received at AND circuits 80, 94, 98 and 100, and two signals received at AND circuits 82, 86, 90 and 102. Three signals would be transmitted only to AND circuits 88 and 92. Since an AND circuit will transmit a signal only when all inputs are present (e.g., 3 in this example), only AND circuits 88 and 92 will transmit a signal. This signal may be received by any display means to indicate directly or indirectly either the presence of signals in RF locations 5 and 7 or the frequencies of the received RF signals.

The disclosed invention provides a technique for reducing ambiguities in a super-heterodyne receiver using harmonic mixing and also a technique for reducing ambiguities caused by time-coincident signals at much lower cost and by a much smaller package than existing receivers. Since so few oscillators are used which are in the 100 MHz range, crystal-controlled oscillators can be used insuring extremely accurate frequency measurements.

An additional size reduction can be made by using a common IF, mixer and harmonic generator combination, and video amplifiers for all channels and switching the local oscillators into the harmonic generator and mixer combination within the pulse width of the signal whose frequency is to be measured.

Although the present invention is described using conventional bandpass filters and detectors, other means of frequency separation and detection may be used such as frequency discriminators and digital filters and detectors.

Obviously many modifications and variations of the present invention are possible in light of the above teachings. It is therefore to be understood that within the scope of the appended claims the invention may be practiced otherwise than as specifically described herein.

What is claimed and desired to be secured by Letters Patent of the United States is:

1. A wide-band, multi-octave, high-resolution receiver for concurrently monitoring a plurality of contiguous frequency channels in a preselected band of the RF spectrum and for detecting and indicating the presence of a signal, or time-coincident signals, within any of said channels by conversion of the signal(s) to a digital mixed-base code notation representative of the frequencies of the detected signal(s), said receiver comprising:

means forming at least two receiving channels, said channels being contiguous in frequency and together covering a pre-selected frequency band of the RF spectrum, each receiving channel comprising;

harmonic mixer means for receiving incoming RF signals and heterodyning the entire preselected RF band to IF frequencies, said harmonic mixing means generating a series of harmonic frequencies which are harmonics of a predetermined integer times said IF bandwidth;

an IF amplifier receiving said heterodyned signals and amplifying them;

a plurality of filter means, each contiguous in frequency and having the same IF bandwidth, said plurality of filter means having a cumulative IF bandwidth equal to that of said IF amplifier, each filter means simultaneously receiving the output signal from said IF amplifier;

a plurality of detector means, each detector means being connected to a different filter means; and utilization means for receiving and indicating the output signals of the plurality of detector means, each detector means supplying a separate input of said utilization means;

the number of such channels necessary to comprise said receiver and the number of filter means per channel being determined using criteria developed utilizing the Chinese Remainder Theorem;

each successive channel containing one additional filter means more than the preceding channel; and the bandwidth of each of said IF amplifiers contained in each of said channels being determined by multiplying the bandwidth of a filter means times the total number of filter means predetermined for that particular channel.

2. The apparatus of claim 1, wherein said harmonic mixer means comprises:

local oscillator means;

harmonic generator means connected to said local oscillator means; and mixer means connected to said harmonic generator.

\* \* \* \* \*